United States Patent [19]

Ash

[11] Patent Number: 5,787,117

[45] Date of Patent: Jul. 28, 1998

[54] RECEIVER/TRANSMITTER HAVING COMMON ELEMENTS

[75] Inventor: Darrell L. Ash, Sachse, Tex.

[73] Assignee: RF Monolithics, Inc., Dallas, Tex.

[21] Appl. No.: 592,287

[22] Filed: Jan. 26, 1996

[51] Int. Cl.$^6$ .................... H03F 1/14; H04B 1/44
[52] U.S. Cl. .................... 375/223; 375/311; 455/83; 3630/51; 3630/310
[58] Field of Search .................... 375/219, 309, 375/311, 313, 222, 223, 312; 455/293, 341, 78, 82, 83, 144; 330/51, 310, 9, 107, 149

[56] References Cited

U.S. PATENT DOCUMENTS

| | | |
|---|---|---|
| 4,682,344 | 7/1987 | Somer .................... 375/62 |
| 4,761,616 | 8/1988 | Ash .................... 331/107 |
| 4,954,793 | 9/1990 | Misu et al. .................... 333/133 |
| 5,231,647 | 7/1993 | Deguchi .................... 375/8 |
| 5,357,206 | 10/1994 | Ash .................... 330/51 |

*Primary Examiner*—Chi H. Pham
*Assistant Examiner*—William Luther
*Attorney, Agent, or Firm*—Jones, Day, Reavis & Pogue

[57] ABSTRACT

A transceiver including a receiver having a sequential amplifier that includes at least first and second RF amplifier stages coupled together by a delay line. A transmitter in the transceiver includes an oscillator for generating an RF carrier and the oscillator includes the delay line as a phase shifting element. A modulator is coupled to the oscillator for modulating the RF carrier either AM, OOK modulated, FM, FSK modulated, PM, and PSK modulated.

17 Claims, 1 Drawing Sheet

RECEIVER/TRANSMITTER HAVING COMMON ELEMENTS

BACKGROUND OF THE INVENTION

1. Field of the Invention

The present invention relates in general to transceivers and in particular to a transceiver in which the receiver portion utilizes a sequential amplifier and in which the transmitter uses a portion of the circuitry in the receiver so as to reduce the number of components required in the transceiver circuit.

2. Description of Related Art Including Information Disclosed Under 37 CFR 1.97 and 1.98

Transmitter receivers are old and well known in the art. They comprise generally a receiver and a transmitter and a transmit/receive control that enables the transmitter and disables the receiver during transmission.

An amplifier that is valuable for use in a transceiver has been disclosed in commonly assigned U.S. Pat. No. 5,357,206 incorporated by reference herein in its entirety. Such amplifier is known as a sequential amplifier and utilizes a minimum of two amplifier stages coupled together by a signal delay device. Each amplifier stage is controlled by a switching unit. Essentially, a signal will be received by the first amplifier stage and the amplifier is energized by the switching unit. The second amplifier stage is de-energized such that the second amplifier will not be substantially operational during the time the first amplifier is in operation. This prevents detrimental signal feedback either by radiation or conduction between the first and the second amplifier stages. The signal from the first RF amplifier stage will pass through the delay device and into the second stage amplifier. Prior to, or at least about the time the signal emerges from the delay line, as the signal reaches the second stage amplifier, the second amplifier will be energized and the first amplifier will be substantially de-energized. In the second stage amplifier, the signal will again be amplified. The first stage amplifier will be switched OFF when the second stage amplifier is switched ON and vice versa.

Also known in the prior art is a voltage controlled oscillator such as disclosed in commonly assigned U.S. Pat. No. 4,761,616 incorporated herein by reference in its entirety. The voltage controlled oscillator has an amplifier coupled in series with a SAW coupled resonator. The SAW coupled resonator may be replaced with a delay line surface acoustic wave device.

Since U.S. Pat. No. 4,761,616 discloses a voltage controlled oscillator which uses a SAW device in the feedback loop and the SAW device can be a delay line, and since U.S. Pat. No. 5,357,206 requires a delay line between sequential amplifier stages, it would be advantageous to combine the two circuits such that the delay line between the sequential amplifiers in the receiver stage could be used during transmission to form an oscillator for generating the carrier frequency for the transmitter.

SUMMARY OF THE INVENTION

Thus the present invention combines elements in the receiver with elements in the transmitter such that during transmission, certain of the elements in the receiver are used as a part of the transmitter.

In particular, the delay line that couples first and second RF stages in the sequential amplifier is used with a third RF amplifier when the unit is transmitting to form an oscillator for generating the transmitter carrier frequency.

If the output of the oscillator is coupled to a fourth amplifier stage, in the transmitter, then a transmit control circuit can be used to disable the first and second RF amplifiers in the receiver and enable the third and fourth RF amplifiers in the transmitter to generate oscillator carrier signals that are to be modulated with data. For instance, the transmit control circuit may amplitude modulate the oscillator carrier signals that are being transmitted. Thus, the transmit control circuit may turn ON and OFF the third and fourth RF amplifiers in the transmitter to provide on-and-off key (OOK) amplitude modulation according to the data applied thereto.

In another embodiment, a frequency modulation circuit is coupled between the delay line and the third RF amplifier forming the oscillator circuit. Data is supplied to the frequency modulation circuit to frequency modulate (FM) the oscillator carrier signals. A transmit control circuit turns ON the third and fourth amplifier stages to couple the frequency modulated RF signals to an antenna. In another embodiment, the FM circuit frequency shift key (FSK) modulates the oscillator carrier signal with the data.

Also, a phase-shift modulator (PSM) circuit may be coupled between the output or fourth amplifier in the transmitter and the antenna. A transmit control circuit can turn ON the third and fourth RF amplifiers in the transmitter to couple the oscillator carrier frequency to the phase modulation circuit. Data can then be supplied to the phase modulation circuit for phase modulating the carrier frequency coupled to the antenna. If desired, the phase modulation circuit may be used to phase shift key modulate (PSKM) the oscillator carrier signal with the data.

Thus, it is an object of the present invention to provide a transceiver in which a receiver circuit is formed of first and second series coupled RF amplifier stages being coupled to each other by a delay line. The first RF amplifier is coupled to the antenna for receiving RF signals. A receiver control circuit is coupled to the first and second RF amplifiers for turning OFF both said first and second RF amplifiers simultaneously during transmission and for sequentially turning ON and OFF said first and second RF amplifiers when receiving RF signals. The delay line prevents the first and second RF amplifiers from oscillating. This is the circuit disclosed in U.S. Pat. No. 5,357,206. A demodulator, of course, is coupled to the second RF amplifier for receiving the amplified and RF signals therefrom and demodulating the signals to generate output data.

The transmitting circuit includes third and fourth series coupled RF amplifiers having sufficiently low gain so as to prevent oscillation between them. The delay line of the receiver is coupled across the third RF amplifier to form a delay line oscillator as disclosed in U.S. Pat. No. 4,761,616 for generating an oscillator carrier signal. The fourth RF amplifier has an input for receiving the oscillator carrier signals and an output for coupling the oscillator carrier signals to the antenna. A transmit control circuit is coupled to the third and fourth RF amplifiers to enable the oscillator carrier signal to be modulated with data. A transmit/receive switch is coupled to the receiver control circuit and to the transmitter control circuit for selectively enabling either the transmission or the reception of RF signals.

It is also an object of the present invention to amplitude modulate the oscillator carrier signals that are being transmitted.

It is still another object of the present invention to provide on-and-off key amplitude modulation of the oscillator carrier signals that are being transmitted.

3

It is yet another object of the present invention to frequency modulate the oscillator carrier signal with data.

It is still another object of the present invention to frequency shift key modulate the oscillator carrier signal with data.

It is still another object of the present invention to provide a phase modulation circuit in the transceiver and to supply data to the phase modulation circuit for phase modulating the carrier frequency coupled to the antenna when transmitting RF signals.

It still another object of the present invention to phase shift key modulate the oscillator carrier signal with said data in said phase modulation circuit.

Thus, the present invention relates to a transceiver including a receiver circuit and a transmitting circuit both of which are coupled to an antenna. The receiver circuit includes first and second series coupled RF amplifiers coupled to each other by a delay line. The first RF amplifier is coupled to the antenna for receiving RF signals. A receiver control circuit is coupled to the first and second RF amplifiers for turning OFF both the first and second RF amplifiers simultaneously during transmission and sequentially turning ON and OFF the first and second RF amplifiers when receiving RF signals. The delay line prevents the first and second RF amplifiers from oscillating. A demodulator is coupled to the second RF amplifier for receiving the amplified RF signal and demodulating the signal to generate output data. The transmitting circuit includes third and fourth series coupled RF amplifiers having sufficiently low gain so as to prevent oscillation between them. The delay line of the receiver is coupled across the third RF amplifier to form a delay line oscillator for generating oscillator carrier signals. The fourth RF amplifier has an input for receiving the oscillator carrier signals and an output for coupling the oscillator carrier signals to the antenna. A transmit control circuit is coupled to the third and fourth RF amplifiers to enable the oscillator carrier signals to be modulated with data. A transmit/receive switch is coupled to the receiver control circuit and to the transmit control circuit for selectively enabling either the transmission or the reception of RF signals.

The entire receiver and transmitter may be formed of a single integrated circuit with the SAW delay line being attached to the integrated circuit to form the transceiver.

BRIEF DESCRIPTION OF THE DRAWINGS

These and other objects of the present invention will be more fully disclosed in the following DETAILED DESCRIPTION OF THE PREFERRED EMBODIMENT in which like numerals represent like elements and in which.

DETAILED DESCRIPTION OF THE PREFERRED EMBODIMENT

Figure 1:
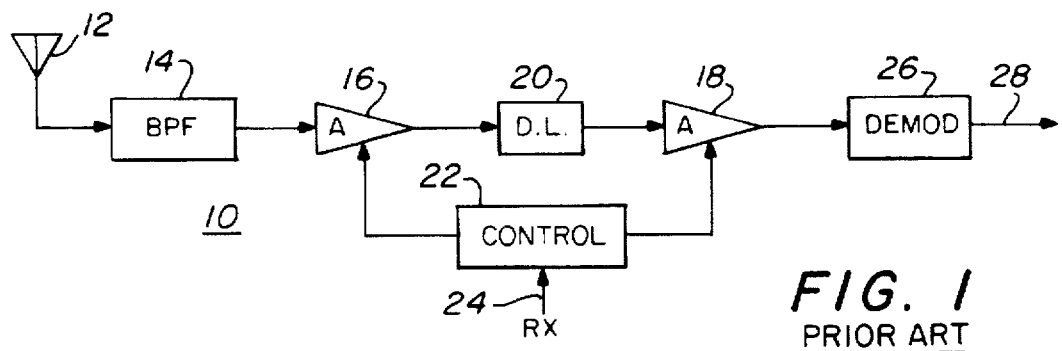
FIG. 1 is a schematic electrical diagram of a sequential amplifier.

FIG. 1 illustrates the sequential amplifier receiver as disclosed in U.S. Pat. No. 5,357,206 or U.S. Pat. No. 5,357,207, both of which are incorporated herein by reference in their entirety. The sequential amplifier 10 includes an antenna 12 coupled to a band-pass filter 14 whose output serves as the input to RF amplifier 16. A second RF amplifier 18 is coupled to RF amplifier 16 through a delay line 20. A control circuit 22 is enabled by a receive switch signal 24 and alternately enables amplifiers 16 and 18. When amplifier 16 is enabled, amplifier 18 is substantially disabled. The amplifier 16 amplifies the received signal and couples it to delay line 20. As the signal substantially emerges from delay line 20, amplifier 16 is disabled and amplifier 18 enabled by the control circuit 22. The amplified signal is detected with demodulator 26 and the detected output is generated on line 28.

Figure 2:
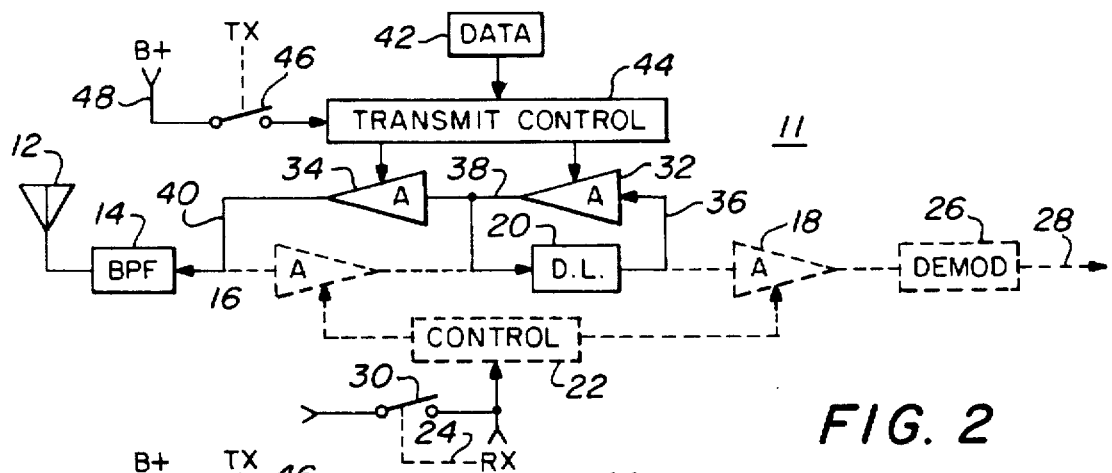
FIG. 2 is a schematic electrical diagram of the transceiver including an amplitude modulation circuit.
Figure 3:
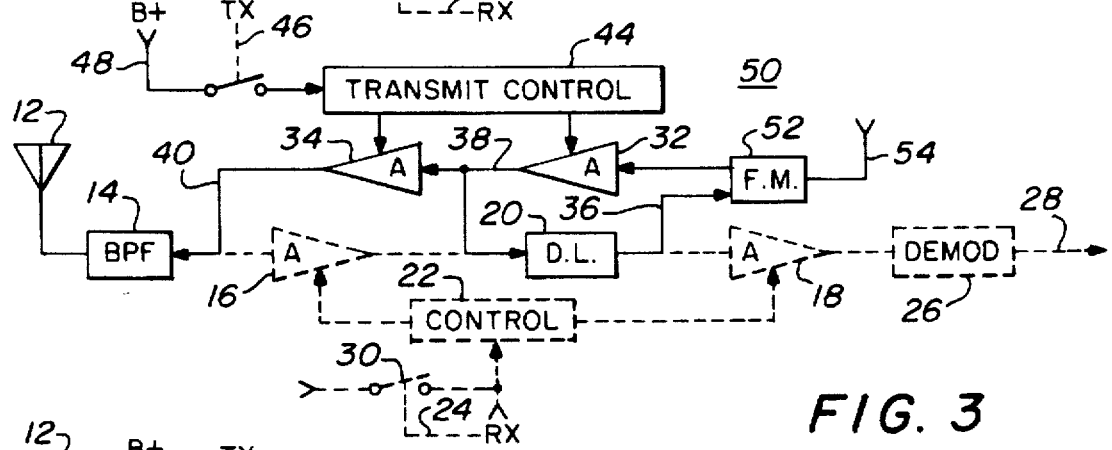
FIG. 3 is a schematic electrical diagram of the transceiver including a frequency modulation circuit.
Figure 4:
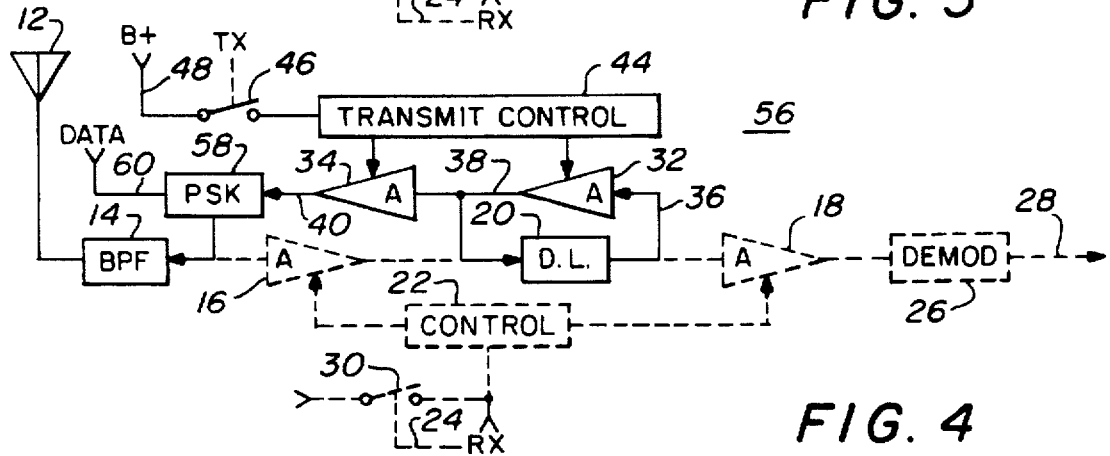
FIG. 4 is a schematic electrical diagram of the transceiver including a phase modulation circuit.

The novel transceiver of the present invention is illustrated in FIGS. 2, 3, and 4, with FIG. 2 illustrating an amplitude modulation transceiver, FIG. 3 illustrating a frequency modulation transceiver, and FIG. 4 illustrating a phase modulation transceiver.

In FIG. 2, the portions of the receiver that are not utilized during transmission are shown in phantom lines. Thus the two amplifiers 16 and 18 and their control unit 22 along with demodulator 26 are unused. However, the antenna 12, the band-pass filter 14, and the delay line 20, all used in the receiver circuit, are also used in the transmitter circuit. Thus amplifiers 16 and 18 may be referred to as first and second amplifiers that are used in the receiver. Amplifiers 32 and 34 in the transmitter circuit may be designated as third and fourth amplifiers.

With such designations, consider the operation of the transmitter. The delay line 20, which is also common to the receiver circuit as indicated above, is coupled across the third RF amplifier 32 to form a delay line oscillator as disclosed in U.S. Pat. No. 4,761,616 and generates oscillator carrier signals. The fourth RF amplifier 34 has an input on line 38 for receiving the oscillator carrier signals and an output on line 40 for coupling the oscillating carrier signals to the antenna 12 through band-pass filter 14. Transmit control circuit 44 is coupled to the third and fourth RF amplifiers 32 and 34 to enable the oscillator carrier signals to be modulated with data. The data at 42 is coupled to the transmit control 44 and, when transmit switch 46 is closed coupling power from terminal 48 to the control 44, the transmitter control circuit 44 amplitude modulates the oscillator carrier signals that are being transmitted. The amplitude modulation is accomplished in any well-known manner. During use of the receiver portion of the transceiver 11, the transmit switch 46 is open and the transmission circuit is disabled. During use of the transmitter portion of the transceiver, the receive switch 30 is open and the receiver portion of the transceiver is disabled.

FIG. 3 is a circuit similar to that shown in FIG. 2 except that the transceiver 50 includes a transmitter that frequency modulates the carrier. In this instance, the frequency modulation circuit 52 is coupled between the delay line 20 and the third RF amplifier 32. The data 54 is coupled to the frequency modulator circuit 52 to modulate the oscillator carrier frequency established by the delay line 20 coupled across the third RF amplifier 32. The frequency modulation circuit is old and well known in the art and may frequency shift key modulate the oscillator carrier signal with the data 54. The FM circuit 52 is old and well known in the art and need not be discussed in detail here.

In like manner, FIG. 4 discloses a transceiver 56 in which a phase modulation circuit 58 is coupled between the fourth RF amplifier 34 and the band pass filter 14. The transmit control circuit 44, when energized by closure of the transmission switch 46, turns ON the third and fourth RF amplifiers 32 and 34 to establish the carrier frequency and to amplify the carrier with amplifier 34 and couple it on line 40 to the phase modulation circuit 58 where data on line 60 is used to phase modulate the carrier. Such phase modulation circuits 58 are old and well known in the art and are not discussed in detail here. In addition, the phase modulation circuit may be a well-known phase shift key modulator to modulate the oscillator carrier signal with the data. Again, phase shift key circuits are old and well known in the art.

In each of the circuits shown in FIGS. 2, 3, and 4, the delay line 20 may be a surface acoustic wave device as disclosed in U.S. Pat. No. 4,761,616. Further, in each of the circuits shown in FIGS. 2, 3, and 4, all of the elements, except the delay line and the bandpass filter, may be formed as a single integrated circuit 16. The delay line may then be attached to the integrated circuit in the correct electrical configuration shown to form the novel transceiver.

Thus there has been disclosed a novel transceiver in which a sequential amplifier is used as the receiver having at least first and second RF amplifier stages connected together with a delay line and wherein the delay line is common to both the receiver and the transmitting circuit. The delay line is coupled across an amplifier in the transmitter circuit to form an oscillator that generates the carrier signal. The carrier signal may be modulated with AM, on-and-off key amplitude modulation, frequency modulation, frequency shift key modulation, phase modulation, or phase shift key modulation. Clearly, the carrier could be modulated in any manner desired.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A transceiver comprising:
   a receiver circuit and a transmitting circuit, both of which are coupled to an antenna;
   said receiver circuit comprising:
   first and second series coupled RF amplifiers;
   a delay line coupling said first and second series coupled RF amplifiers to form a sequential amplifier;
   said first RF amplifier being coupled to said antenna for receiving a first modulated RF carrier signal;
   a receiver control circuit coupled to said first and second RF amplifiers for turning OFF both said first and second RF amplifiers simultaneously during transmission and for sequentially turning ON and OFF said first and second RF amplifiers when receiving said first modulated RF carrier signal, said delay line preventing said first and second RF amplifiers from oscillating; and
   a demodulator coupled to said second RF amplifier for receiving said first RF carrier signal therefrom and demodulating said first RF carrier signal to generate output data; and
   said transmitting circuit comprising:
   third and fourth series coupled RF amplifiers having sufficiently low gain so as to prevent oscillation between them;
   said delay line being coupled across said third RF amplifier to form a delay line oscillator for generating a second RF carrier signal for transmission;
   said fourth RF amplifier having an input for receiving said second RF carrier signal and an output for coupling said second RF carrier signal to said antenna; and
   a transmit control circuit coupled to said third and fourth RF amplifiers to enable said second RF carrier signal to be modulated with transmission data; and
   a transmit/receive switch coupled to said receiver control circuit and to said transmit control circuit for selectively enabling either said reception or said transmission of said first and second modulated RF carrier signals, respectively.

2. A transceiver as in claim 1 further including:
   said transmit control circuit receiving data; and
   said transmit control circuit amplitude modulating said second RF carrier signal that is being transmitted.

3. A transceiver as in claim 2 further including said transmit control circuit turning ON and OFF said third and fourth RF amplifiers to provide on-and-off key (OOK) amplitude modulation.

4. A transceiver as in claim 1 further including:
   a frequency modulation (FM) circuit coupled between said delay line and said third RF amplifier;
   an input terminal for supplying said transmission data to said frequency modulation circuit for frequency modulating said second RF carrier signal; and
   said transmit control circuit turning ON said third and fourth RF amplifiers to generate and couple said frequency modulated second RF carrier signal to said antenna.

5. A transceiver as in claim 4 wherein said FM circuit frequency shift key (FSK) modulates said second RF carrier signal with said transmission.

6. A transceiver as in claim 1 further including:
   a phase modulation (PM) circuit coupled between said fourth RF amplifier and said antenna;
   said transmit control circuit turning ON said third and fourth RF amplifiers to generate and couple said second RF carrier signal to said phase modulation circuit; and
   an input terminal for supplying transmission data to said phase modulation circuit for phase modulating said second RF carrier signal coupled to said antenna.

7. A transceiver as in claim 6 wherein said phase modulation circuit phase shift key (PSK) modulates said second RF carrier signal with said data.

8. A transceiver as in claim 1 further including a bandpass filter coupled between said antenna and said first and fourth RF amplifiers to filter said first and second modulated RF carrier signals being both transmitted and received.

9. A transceiver as in claim 1 further including:
   a single integrated circuit including both said receiver and said transmitter; and
   said SAW delay line being attached to said integrated circuit to form said transceiver.

10. A transceiver including:
    an antenna;
    an RF receiver including a sequential amplifier coupled to said antenna for amplifying a received modulated first RF carrier signal;
    said sequential amplifier including at least first and second RF amplifiers;
    a demodulator coupled to said sequential amplifier for detecting data in said received modulated first RF carrier signal;
    a transmitter including an oscillator for generating a second RF carrier signal, said oscillator including a phase shifting element;

a modulator coupled to said oscillator for modulating said second RF carrier signal for transmission by said antenna;

switching means coupled to said RF receiver and said transmitter for selectively activating either one of said RF receiver and said transmitter; and a delay line responsive to said switching means and commonly used in said RF receiver to couple said first and second RF amplifier together only when said RF receiver is activated and in said transmitter oscillator as said phase shifting element only when said transmitter is activated.

11. A transceiver as in claim 10 further including a single integrated circuit including both said receiver and said transmitter, said delay line being attached to said single integrated circuit to form said transceiver.

12. A transceiver as in claim 10 wherein said first and second RF carriers are amplitude modulated (AM).

13. A transceiver as in claim 12 wherein said first and second RF carriers are on-off key (OOK) amplitude modulated.

14. A transceiver as in claim 10 wherein said first and second RF carriers are frequency modulated (FM).

15. A transceiver as in claim 14 wherein said first and second RF carriers are frequency shift key (FSK) modulated.

16. A transceiver as in claim 10 wherein said first and second RF carriers are phase modulated (PM).

17. A transceiver as in claim 16 wherein said first and second RF carriers are phase shift key (PSK) modulated.

* * * * *